United States Patent

[11] 3,626,828

[72] Inventor  Walter F. Lindsey
                Hampton, Va.
[21] Appl. No. 811,038
[22] Filed      Mar. 27, 1969
[45] Patented   Dec. 14, 1971
[73] Assignee   The United States of America as represented by the Administrator of the National Aeronautics and Space Administration

[54] STEREO PHOTOMICROGRAPHY SYSTEM
     5 Claims, 2 Drawing Figs.
[52] U.S. Cl. .................................................. 95/18
[51] Int. Cl. ............................................ G03b 35/08
[50] Field of Search ....................................... 95/18;
                                                            355/22

[56]              References Cited
              UNITED STATES PATENTS
1,505,268   8/1924   Larson .......................... 355/22
2,614,454  10/1952   Steffen .......................... 355/77
2,639,653   5/1953   Fischer .......................... 355/22

Primary Examiner—John M. Horan
Attorneys—Howard J. Osborn and G. T. McCoy

ABSTRACT: A stereo photomicrography system having a stereo microscope capable of viewing a specimen at various magnifications. Support structure for holding a stereo camera which can be optically aligned with the stereo microscope. A focusing microscope with a very shallow depth of field positionable over the stereo camera and adjustable to focus on a reticle that can be placed at the film plane of the stereo camera. A specimen holder which has height adjustment with respect to the stereo microscope and indicating mechanism associated therewith for producing readings of the height of the specimen. A photometer which can be utilized to measure the light intensity in the specimen image of the film plane. The use of this equipment wherein the various heights of the specimen and the light intensities taken at various magnifications of the microscope can be utilized in conjunction with the film speed to obtain stereo microphotographs at various magnifications providing sharp and clear stereo photos.

STEREO PHOTOMICROGRAPHY SYSTEM

ORIGIN OF THE INVENTION

The invention described herein was made by an employee of the United States Government and may be manufactured and used by or for the Government for governmental purposes without the payment of any royalties thereon or therefor.

This invention relates to a stereo photomicrograph system, and more particularly to such a system which will provide clearer and sharper stereo microphotographs.

Various procedures presently exist for obtaining stereo microphotos. One of the methods is by visually focusing the stereo microscope on the specimen with the eyes focused at infinity so that the parallel rays will emerge from the eyepieces. The stereo camera is then focused at infinity with corrective prisms over the microscope eyepieces. With the camera back off, the film plane is exposed and an average reading of image brightness is obtained at this point using a photoemissive tube. From this reading an approximate exposure is determined and the film placed in the camera and exposed. This procedure is a cut-and-try procedure which sometimes produced fairly good photographs and other times poor photographs.

Another technique of using the stereo microscope is that of using a camera which has the focus of its lenses fixed at different positions in conjunction with the microscope. Again focus and exposure is by trial and error resulting in a hit-and-miss arrangement.

The use of a ground glass screen or reticle located at the film plane prior to insertion of the film has also been utilized. With this arrangement the image is formed on the reticle and departure from the focus is fairly easily seen if the specimen contains rather contrasting areas. However, where the specimen image detail is very fine and lacking in contrast, the visible granularity or lines of the reticle itself make focusing difficult.

The present invention overcomes the difficulties of the prior art methods by providing an arrangement whereby sharp focusing of the specimen is obtained with the use of a focusing microscope and specimen height adjusting device prior to exposure of the film. In addition, the light intensity for a particular focus is accurately ascertained, this data being utilized in conjunction with specimen height and the film speed to provide an exposure setting which results in sharp and clear stereo microphotos.

It is therefore an object of the invention to provide a a stereo photomicrography system which will produce sharply defined images with an optimum depth of field.

Yet another object of the invention is to provide a stereo photomicrography system which utilizes a focusing microscope having a small depth of field.

Another object of the invention is to provide a stereo micrography system having a specimen support with height adjustment, and associated mechanism to measure the position of the specimen.

A further object of the invention is to provide a stereo micrography system which uses a photoconductive cell having a very small diameter for examining the image brightness.

Still another object of the invention is to provide a stereo micrography system that will produce a high-quality photograph, quickly and reliably.

An added object of the invention is to provide a method for producing stereo microphotographs.

These and other objects and advantages of the invention will become more apparent upon reading the specification in conjunction with the accompanying drawings.

Figure 1:
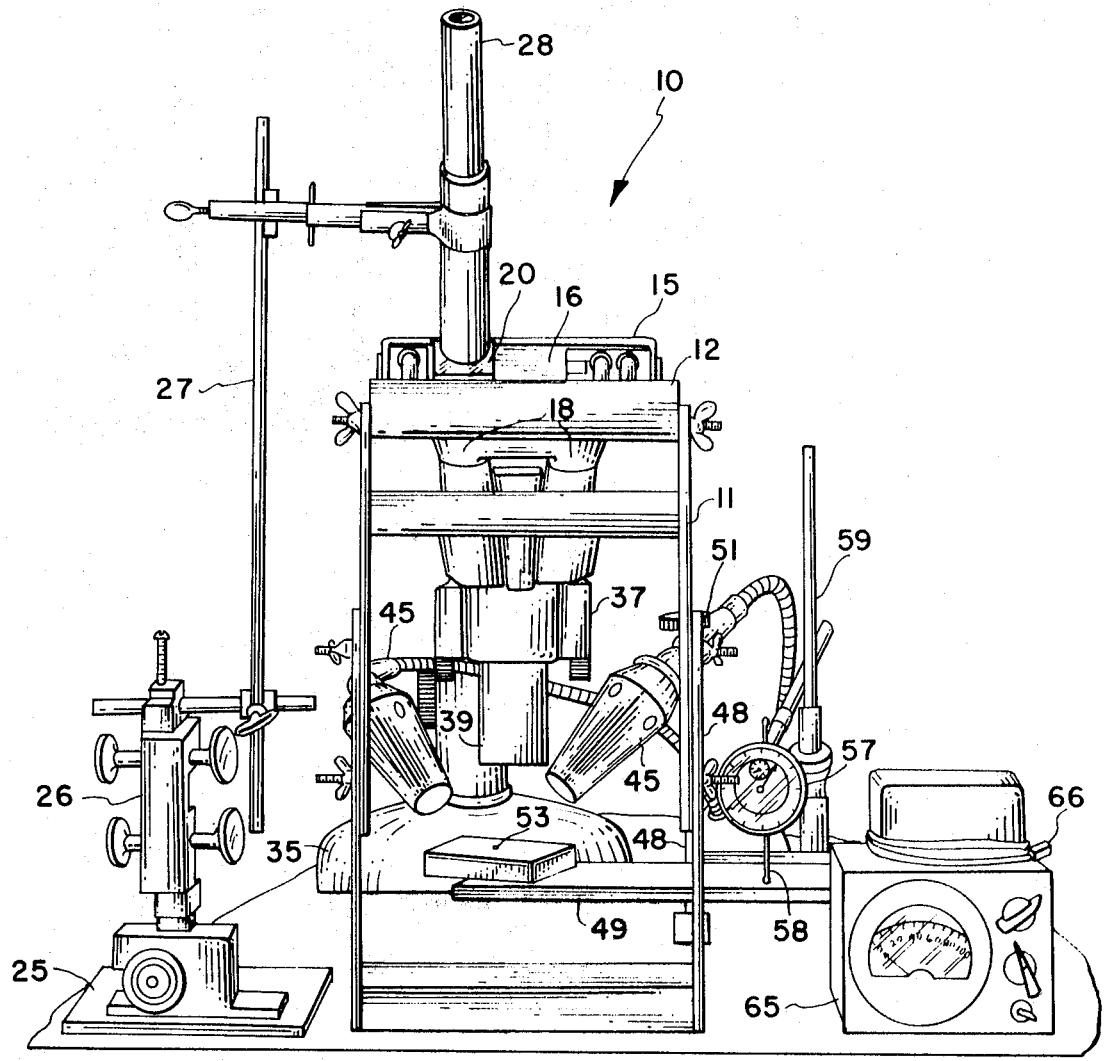
FIG. 1 is a front elevational view of the stereo photomicrography system.
Figure 2:
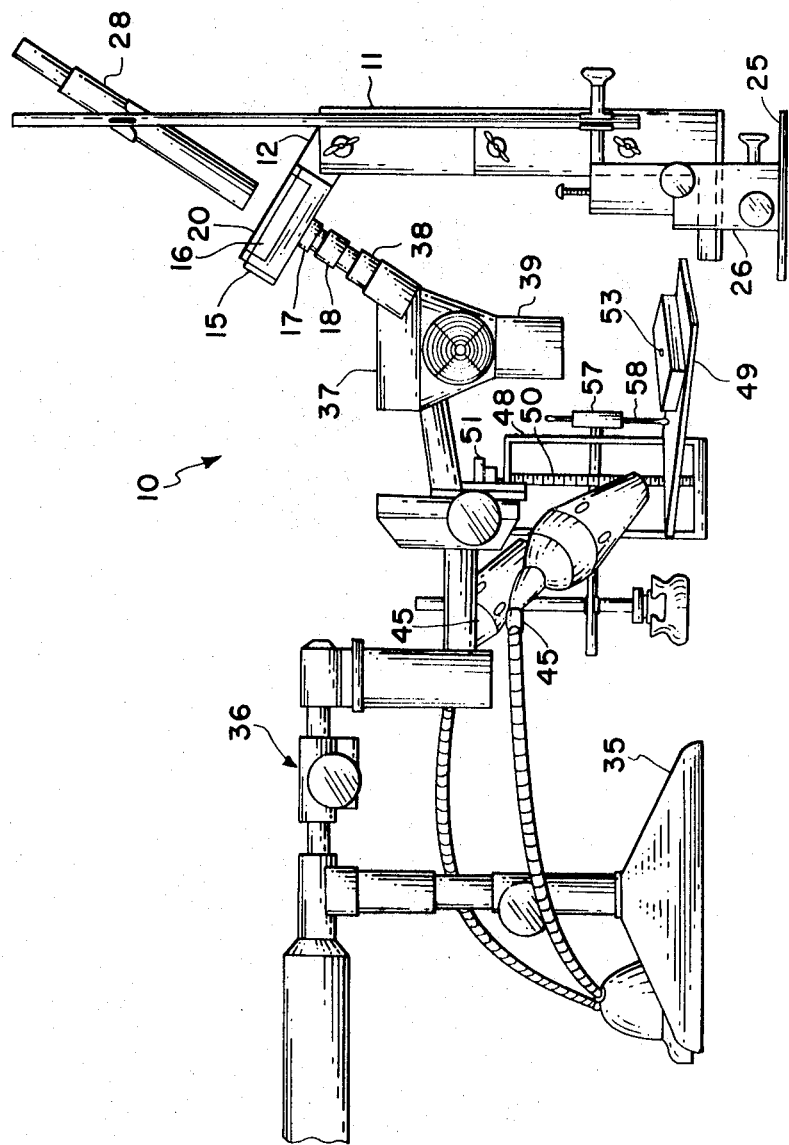
FIG. 2 is a side elevational view of the stereo photomicrography system.

Referring now more specifically to the details of the invention, FIGS. 1 and 2 show the stereo photomicrography system designated generally by the reference numeral 10.

The system includes a camera stand 11 which has a rectangular shape, the sides of which are of an overlapping nature having setscrews for allowing adjustment as to height. The sides are joined together by cross bracing and positioned at the top is a platform 12. The platform 12 is pivotally mounted on screws extending through the sides of the support. The screws are provided with wing nuts for tightening the platform between the sides of the stands and maintaining it in a desired position.

A stereo camera 15 is supported by the platform 12 in a conventional manner. Most any type of commercially available stereo camera may be utilized; however, for purposes of this invention, the Stereo Realist camera was used. This camera has a back which is movable, the opening in the back of the camera being designated by reference numeral 16 in the drawings. The camera has a pair of lenses 17 which are associated with corrective prisms 18, the prisms being utilized to optically align the stereo camera with the eyepieces of the stereo microscope to be described more fully hereinafter.

The reference numeral 20 designates a reticle or ground glass structure which is utilized in focusing the camera on the specimen. The reticle 20 is positioned at the film plane of the stereo camera to assist focusing, and after it has served its purpose removed and the camera loaded with film.

Positioned adjacent camera stand 11 is a platform 25 which is utilized to hold a focusing microscope 28. Included in the platform assembly 25 is an X, Y, Z positioning mechanism which consists of a series of racks and pinions with associated turning knobs for movement in the Various planes. This mechanism is of conventional design and is similar in construction to a schlieren knife edge X, Y, Z positioning structure. Connected to the positioner is adjustable linkage 27 which is utilized to hold the focusing microscope 28 in position over the stereo camera 25.

The focusing microscope 28 is again structure which is available commercially, and for purposes of the invention should be of moderate power, for example about 50 X, have a fairly large field coverage, but a very small depth of field (a few thousandths of an inch).

A pedestal 35 with positioning apparatus 36 supports the stereo microscope 37. The eyepiece 38 of the microscope are aligned with the corrective prisms 18. Various types of stereo microscopes might be utilized; however, the particular instrument utilized in the setup shown in FIGS. 1 and 2 was a "-Cycloptic Stereoscoptic Microscope" made by the American Optical Company. This particular microscope has a turret with positive stops which allows various powers of magnification to be utilized. The magnification can also be varied by changing one or both of the eyepieces and/or the objective lenses. One of the eyepieces has a fixed focus whereas the other is adjustable.

Lights 45 for illuminating the specimen are in the nature of a gooseneck lamp which has a base and flexible neck which extend therefrom and can be positioned relative to the specimen.

A specimen holder 48 is located adjacent to the stereo microscope 37. The specimen holder 48 has a generally rectangular-shaped frame with a micrometer adjusting screw 50 threaded through the top of frame. A turning knob 51 is connected to the adjusting screw 50. Connected to the adjusting screw 50 is a specimen holding plate 49 which is raised and lowered relative to the microscope upon turning the adjusting screw. Specimen 53 is shown lying on the plate 49 in position under the stereo microscope. A portion of the plate extends beyond the holder frame and is located to enable contact by a measuring instrument now to be described.

The measuring instrument is designated generally by the reference numeral 57 and is of the dial indicator type capable of measuring position to 0.001 inch such as sold by the Starrett Instrument Corporation. As with the usual dial indicator apparatus, a stand 59 is provided with an arm 58 which holds and may be utilized to position the indicator at the proper position. This is best illustrated in FIG. 1 of the drawings.

Also positioned adjacent camera stand 11 is a photometer 65. Forming a part of the photometer is a photo conductive cell 66 which may be positioned at the specimen to determine image brightness. The photoconductive cell is connected by wire 67 to the photometer 65 to enable mobility of the cell. The photometer is calibrated to permit the readings to be converted into image brightness. The photometer equipment and photo conductive cell associated therewith are also available commercially. The photo conductive cell utilized in the invention has a small diameter, approximately 0.25 inch or less to enable examination of various parts of the image for improved exposure determination and control in a manner to be described more fully hereinafter.

METHOD AND OPERATION

Having discussed the apparatus above, the procedure for utilizing the apparatus to obtain clear and sharp microphotos will now be explained.

The specimen holder 48 is set so that measureable up-and-down motion is obtainable. The holder is positioned so that the specimen 53 is supported on the holder plate 49 under the stereo microscope objective lens 39. The stereo microscope is raised or lowered to bring the specimen into visual focus through the fixed eyepiece which is one of the eyepieces 38. The movable eyepiece, which is the other eyepiece, is adjusted to the same height as the fixed eyepiece so that it has the same focus. The spacing of the microscope eyepiece 38 are then adjusted to the same spacing as the lens 17 on the stereo camera which is positioned above the eyepieces of the stereo microscope. Proper height and alignment of the stereo camera can be obtained by adjusting the height of the stand 11 and tilting of the platform 12. On completion of the microscope and camera alignment the corrective prisms 18 are placed over the stereo microscope eyepieces and beneath the lenses of the stereo camera. The stereo camera 15 is located over the eyepieces of the stereo microscope so that the optical axis of the microscope as corrected by the prisms coincides with the optical axis of the camera. Throughout the remainder of the procedure, the stereo camera 15 corrective prisms 18, and the stereo microscope 37 remain fixed with respect to each other, unless for some reason the adjustable eyepiece gets out of focus with the fixed eyepiece.

The back of the camera 15 is removed and a ground glass or lined reticle 20 is positioned in the same place that the camera film would occupy assuming the camera was loaded with film. With the light 45 turned off, the focusing microscope 28 is positioned over the reticle 20 at the fixed eyepiece position of the stereo microscope. Proper location of the focusing microscope 28 can be obtained by operation of the X, Y, Z positioner 26. The focusing microscope 28 is carefully focused on the lined reticle 20. Upon completion of focusing, the reticle is removed and the lights 45 beamed onto the specimen 53. The specimen 53 is raised or lowered by the specimen holder adjusting screw 50 until it is sharply in focus as viewed through the focusing microscope 28. A lined reticle can now be placed at the film plane above the adjustable eyepiece and sharp focusing obtained by adjusting the eyepiece and not the specimen height. This adjustment of the eyepiece may permit a slight increase in apparent depth of field; however, if the adjustable eyepiece was originally focused to coincide with the fixed eyepiece, this operation may not be necessary. Thus assuming that both eyepieces are focused, the specimen height is recorded by taking a reading from the dial indicator 57. As is apparent in FIG. 1, the arm 58 of the dial gage 57 contacts the extension of plate 50 providing a height reading for the specimen.

The photoconductive cell 56 is then placed in the available image plane of the stereo camera. The reading on the photometer 65 is recorded indicating the brightness of the image viewed. The magnification at which the specimen is being viewed through the stereo microscope is also recorded.

With this information available, it is possible to load the camera with film and by utilizing the data collected, expose the film and obtain a clear sharp microphoto. However, since it is usually desirable to take pictures at various magnifications, data is normally secured for various magnifications prior to loading the camera with film and taking the pictures.

In order to obtain all the data prior to taking pictures, the magnification of the stereo microscope is changed by rotating the lens turret or by other techniques as previously mentioned. The specimen holder 48 is again adjusted until the specimen is sharply defined in the focusing microscope 28. The height of the specimen is again recorded from the dial gage 57, and the photometer reading recorded. Readings of the height of specimen and brightness indicated by the photometer are then recorded for each variation and magnification of the stereo microscope. These readings are taken, however, without having moved the focusing microscope 28, camera 15 or stereo microscope 37.

The camera is loaded and the film exposed in accordance with the data previously gathered. For each magnification the specimen holder is set at its previously determined height for that magnification. Exposure is then made by utilizing the data as gathered for this setting. Since the photometer 65 is calibrated to be converted into image brightness ($b$) in candles per square foot, the exposure of the film in seconds can be calculated from the formula $T=1/\pi bs$ where $s$ is the ASA speed rating of the film.

In operating the apparatus, it was found that often when the objective lenses were changed or the eyepieces of the stereo microscope changed greatly in magnification, the working distance of the microscope shifted to such an extent that an adjustable height range of the specimen holder 48 and the dial indicator 57 was exceeded. When this occurred, it was necessary to repeat the entire procedure described above. It should be recognized, however, that by changing the objective lenses and/or eyepieces, as utilized in conjunction with the turret lenses, that a large range of magnifications at various increments is obtainable.

From the above description, it should be clear that the guesswork has been eliminated regarding proper focusing of the specimen on the film plane enabling sharp and clear photographs to be taken. Furthermore, by utilizing the method suggested, pictures covering a range of magnification can be obtained on a single roll of exposed film. Use of a photoconductive cell in conjunction with the photometer wherein the photosensitive area of the cell is quite small allows various parts of the image to be examined for improved exposure determination or control. The use of many commercially available items in the environment of this invention provides a combined apparatus which is highly reliable, accurate and provides maintenance-free operation.

What is claimed as new and desired to be secured by Letters Patent of the United States is:

1. The method of obtaining stereo microphotos comprising:
   fixing a stereo camera, corrective prisms, and a stereo microscope relative to each other;
   placing a specimen under the stereo microscope;
   focusing the microscope eyepieces on the specimen;
   aligning the optical axis of the camera with the microscope using the corrective prisms;
   placing a reticule at the film plane in the camera;
   focusing a focusing microscope on the reticule;
   removing the reticule;
   lighting the specimen;
   moving the specimen up or down to bring it into sharp focus with the focusing microscope;
   recording the height of the specimen;
   obtaining a light reading from a photometer;
   recording the stereo microscope magnification;
   loading the camera with film; and
   exposing the film at the specimen height, light reading and magnification previously recorded.

2. The method of obtaining stereo microphotos as in claim 1 wherein the position of the specimen and the light readings are obtained for various stereo microscope magnifications prior to exposing the film; said film being exposed at the various magnifications with corresponding specimen heights and light readings.

3. The method of obtaining stereo microphotos as in claim 2 including the step of maintaining the focusing microscope, stereo camera, and stereo microscope in fixed relative position while readings are obtained at the various magnifications.

4. The method of obtaining stereo microphotos as in claim 1 wherein the reticle is again placed in the camera film planes after adjustment of specimen height by sharp focusing with the focusing microscope and additional sharp focusing of the specimen is obtained by focusing the stereo microscope adjustable eyepiece.

5. The method of obtaining stereo microphotos as in claim 1 wherein a selected area of interest of the image is examined by the photometer.

* * * * *